United States Patent [19]
Mori

[11] 4,188,079
[45] Feb. 12, 1980

[54] MULTIPLE-LAYER METAL BEARING FOR USE IN A LARGE-SIZE ENGINE

[75] Inventor: Sanae Mori, Nagoya, Japan
[73] Assignee: Daido Metal Company Ltd., Nagoya, Japan
[21] Appl. No.: 879,973
[22] Filed: Feb. 22, 1978
[30] Foreign Application Priority Data
  Aug. 22, 1977 [JP] Japan .............................. 52/100277
[51] Int. Cl.$^2$ ......................... F16C 33/06; F16C 9/02
[52] U.S. Cl. .............................. 308/237 R; 428/645; 428/654
[58] Field of Search .................. 308/237 R, DIG. 8; 428/643, 645, 654; 75/140

[56] References Cited
U.S. PATENT DOCUMENTS

| | | | |
|---|---|---|---|
| 2,741,016 | 4/1956 | Roach | 428/645 |
| 2,741,018 | 4/1956 | Schaefer | 308/237 R |
| 2,852,365 | 9/1958 | Schluchter | 428/645 |
| 3,809,551 | 5/1974 | Morisaki | 75/140 |

FOREIGN PATENT DOCUMENTS 136818 11/1977 Japan .
722552 1/1955 United Kingdom .................. 428/654

*Primary Examiner*—Charles E. Frankfort
*Attorney, Agent, or Firm*—Karl W. Flocks

[57] ABSTRACT

A multi-layer metal bearing for use in a large-size engine or the like has three layers including a steel backing layer, a bonding or an intermediate layer of aluminum or aluminum alloy, and a bearing alloy layer consisting of more than 50% up to 65% by weight of tin, more than 0.5% up to 1.5% by weight of copper, and the remainder being essentially aluminum. The hardness of this bearing alloy at a relatively high temperature such as 100° C. or higher is in the mid-range between that of the convention Al/Sn bearing alloy having 50% by weight or less of tin and that of the conventional white metal bearing alloy. This multi-layer metal bearing for use in a large-size engine presents a remarkably improved resistances against load and fatigue.

4 Claims, 3 Drawing Figures

MULTIPLE-LAYER METAL BEARING FOR USE IN A LARGE-SIZE ENGINE

The present invention relates in general to a multi-layer metal bearing for use in a large-size engine and the like, and more particularly to the improvement of the prior invention as disclosed in the applicant's prior co-pending application Ser. No. 945,997, filed Sept. 26, 1978, which is a C-I-P of Ser. No. 795,331, filed May 9, 1977 and now abandoned, without prejudice (hereinafter referred to as "the prior invention").

In the invention of applicant's prior application, there is proposed a multi-layer metal bearing having a steel backing layer, a bonding layer of aluminum or aluminum alloy, and a layer of bearing metal, and the multi-layer metal bearing having a further surface layer in addition to the three layers of metals as stated above, both for use in a large-size engine or the like. The subject matter of the above mentioned inventions resides in that the composition of the above stated layer of bearing alloy is such that; (a) 45 to 65% by weight is of tin (Sn), and the remainder is essentially aluminum (Al), (b) 45 to 65% by weight is of Sn, 0.5% by weight or less is of copper (Cu) and the remainder is essentially of Al, c) the bearing alloy compositions are (a) and (b) as stated above, plus 2% by weight or less in total of one or more elements selected from the group consisting of Ni, Si, Sb, Mn, Pb and Zn, and that the hardness of the bearing alloy at the temperature of 100° C. or higher exists in the mid-range between the known Al/Sn bearing alloys having 50% by weight or less of Sn content and the conventional white metal bearing alloys.

According to the present invention, in contrast to the conventional bearing alloys stated above, it has been found that by way of particularly restricting the content of Sn to the range exceeding 50% up to and inclusive of 65% by weight, and further by defining the Cu content in the range exceeding 0.5% up to, and inclusive of 1.5% by weight in the above stated alloy composition, the resistances against load and fatigue, which are the most significant characteristics required in the bearing materials, can be improved to a remarkable extent without any sacrifice of anti-seizure property. There have been known generally a variety of Al/Sn bearing alloys which contain 50% by weight or less of Sn, and the typical examples of the compositions of such Al/Sn bearing alloys are found to be such that there are approximately 15 to 45% by weight of Sn, 0 to 1% by weight of Cu, and the remainder essentially of aluminum.

According to the generally accepted classification of the bearing alloys, the conventional white metal type bearing alloys can be classified into Sn-based white metals and Pb-based white metals, and according to the JIS (Japanese Industrial Standards) Plain Bearing Materials Classification, are specified as White Metal Class 1 to Class 10 (WJ 1 to 10). Temperatures of the sliding surface of such metal bearings, as generally used is known to be higher than 100° C. under general boundary lubrication conditions.

The hardness in use at 100° C. or higher of the multi-layer bearing metal, for use in a large-size engine, of this invention exists in such a range as is lower than that of the known Al/Sn bearing alloys having 50% by weight or less of Sn and is higher than that of the conventional white metal bearing alloys.

It is a principal object of the present invention to provide a multi-layer metal bearing for use in a large-size engine or the like which is improved substantially in the resistances against load and fatigue in comparison with the conventional metal bearings.

According to the present invention, by way of briefly summarized embodiments thereof, there are provided bearing alloys having the compositions and advantageous characteristics as stated below, i.e.;

(1) A multi-layer metal bearing of this invention consists of a steel backing layers, a bonding layer of aluminum or aluminum alloy, and a layer of bearing alloy, wherein the compositions of the above stated layer of bearing alloy are of such percentage by weight: more than 50% up to 65% of Sn, more than 0.5% up to 1.5% of Cu, and the remainder being essentially of Al, and it has such high temperature hardness value at 100° C. or higher midway between that of the generally known Al/Sn bearing alloys containing 50% or less of Sn and that of the conventional white metals;

(2) A multi-layer metal bearing consisting of a steel backing layer, a bonding layer of aluminum or aluminum alloy, a layer of bearing alloy, and a further surface layer, wherein the compositions of the above stated layer of bearing alloy are of such percentage by weight: more than 50% up to 65% of Sn, more than 0.5% up to 1.5% of Cu, and the remainder essentially of Al, and it has a high temperature hardness at 100° C. or higher midway between that of the generally known Al/Sn bearing alloys containing 50% or less of Sn and that of the known white metals; and (3) A multi-layer metal bearing having the composition as stated in Items (1) and (2) above, plus 2% or less in total of one or two or more elements selected from the group consisting of Ni, Si, Sb, Mn, Pb, and Zn.

The compositions of the generally known Al/Sn bearing alloys as stated above may typically be listed in the following Table 1.

Table 1

| No. | Sn | Cu | Ni | Si | Al | (Wt. %) Remarks |
|---|---|---|---|---|---|---|
| 1 | 5.5 to 7.0 | 0.7 to 1.3 | 0.7 to 1.3 | — | Remain | Low Sn-Al bearing Alloy |
| 2 | 5.5 to 7.0 | 0.7 to 1.3 | 0.3 to 0.7 | 1.0 to 2.0 | " | Low Sn-Al Bearing Alloy |
| 3 | 17.5 to 22.5 | 0.7 to 1.3 | — | — | " | High Sn-Al Bearing Alloy |
| 4 | 26.5 to 32.5 | 0.7 to 1.3 | — | — | " | High Sn-Al Bearing Alloy |
| 5 | 35.0 to 42.0 | 0.7 to 1.3 | — | — | " | High Sn-Al Bearing Alloy |
| 6 | 50 or less | — | — | — | " | High Sn-Al |

Table 1-continued

| No. | Sn | Cu | Ni | Si | Al | (Wt. %) Remarks |
|-----|----|----|----|----|----|----------------|
|     |    |    |    |    |    | Bearing Alloy  |

The compositions of the generally known white metals as stated above may typically be listed in the following Table 2.

Table 2

| Symbol | Sn | Sb | Cu | Pb | Zn | As | Pb | Fe | Zn | Al | Bi | As | Cu |
|--------|----|----|----|----|----|----|----|----|----|----|----|----|----|
| WJ 1 | Bal. | 5.0-7.0 | 3.0-5.0 | — | — | — | 0.50 or less | 0.08 or less | 0.01 or less | 0.01 or less | 0.08 or less | 0.10 or less | — |
| NJ 2 | Bal. | 8.0-10.0 | 5.0-6.0 | — | — | — | 0.50 or less | 0.08 or less | 0.01 or less | 0.01 or less | 0.08 or less | 0.10 or less | — |
| WJ 2B | Bal. | 7.5-9.5 | 7.5-8.5 | — | — | — | 0.50 or less | 0.08 or less | 0.01 or less | 0.01 or less | 0.08 or less | 0.10 or less | — |
| WJ 3 | Bal. | 11.0-12.0 | 4.0-5.0 | 3.0 or less | — | — | — | 0.10 or less | 0.01 or less | 0.02 or less | 0.08 or less | 0.10 or less | — |
| WJ 4 | Bal. | 11.0-13.5 | 3.0-5.0 | 13.0-15.0 | — | — | — | 0.10 or less | 0.01 or less | 0.01 or less | 0.08 or less | 0.10 or less | — |
| WJ 5 | Bal. | — | 2.0-3.0 | — | 28.0-29.0 | — | 0.10 or less | — | 0.05 or less | — | — | — | — |
| WJ 6 | 44.0-46.0 | 11.0-13.0 | 1.0-3.0 | Bal. | — | — | 0.10 or less | 0.05 or less | 0.01 or less | — | 0.20 or less | — | |
| WJ 7 | 11.0-13.0 | 13.0-15.0 | 1.0 or less | Bal. | — | — | 0.10 or less | 0.05 or less | 0.01 or less | — | 0.20 or less | — | |
| WJ 8 | 6.0-8.0 | 16.0-18.0 | 1.0 or less | Bal. | — | — | 0.10 or less | 0.05 or less | 0.01 or less | — | 0.20 or less | — | |
| WJ 9 | 5.0-7.0 | 9.0-11.0 | — | Bal. | — | — | 0.10 or less | 0.05 or less | 0.01 or less | — | 0.20 or less | 0.30 or less | |
| WJ 10 | 0.8-1.2 | 14.0-15.5 | Bal. 0.5 | — | 0.75-1.25 | — | 0.10 | 0.05 or less | 0.01 or less | — | — | — | |

As stated above, the high temperature hardness of the bearing alloy of this invention at the level of 100° C. or higher is in the mid-point between that of the known Al/Sn bearing alloys containing 50% by weight or less of Sn and that of the conventional white metal bearing alloys, and this fact may further be discussed in conjunction with FIG. 3. Without referring to the drawing, however, the high temperature hardness of the bearing alloy according to this invention can be described in the following manner. That is to say, the hardness of the bearing alloy according to this invention at the temperature of 100° C. is approx. 18 to 29 Hv, the hardness thereof at 150° C. is approx. 14 to 24 Hv, and the hardness thereof at 200° C. is approx. 9 to 19 Hv, and such high temperature hardness values at the temperature level of 100° C. and higher continuously vary within the range stated above.

Description will now be given on the reasons why the compositions of the bearing alloy layer according to this invention are restricted in the given range, as well as on the effect and function derivable therefrom. In this description, the expressions in percentages are all given by weight.

Cu content 0.5% to 1.5%

If the Cu content is less than 0.5% as in the bearing alloy of the prior application, due to its low hardness there may occour an effect of improvement in such bearing surface property as initial bedding-in property merely due to such a low content of Cu. However, it is essential to have a Cu content of 0.5% to 1.5% in order to retain sufficient fatigue strength as one of the important requirements for use as bearing material. Moreover, if it is required to provide a surface layer, e.g., a soft lead-based alloy surface layer so as to supplement the surface property such as the initial bedding-in property addition of the Cu content of 0.5% to 1.5% is rather advantageous in view of the fact that the addition of Cu renders easier bonding of the alloy layer with the above mentioned surface layer.

Sn content 50% to 65%

If the Sn content is 50% or less, the alloy will turn out to have deficient anti-seizure and embeddability, while with the Sn content exceeding 65% level, it will have a deficient resistance against fatigue, and moreover, the manufacture of an alloy would become very difficult.

One or two, or more elements of 2% or less in total selected from the group of Ni, Si, Sb, Mn, Pb and Zn They are added for the purpose of obtaining the improved mechanical strength of an alloy. If the total percentage of such elements exceeds 2% level, the initial bedding-in property and the embeddability of an alloy will become inferior, therefore, the total value of 2% was specified as maximum.

The nature, principle, and details of the present invention as well as further objects and advantages thereof, will become more apparent from the following detailed description with respect to a preferred embodiment of the present invention, when read in conjunction with the accompanying drawings.

Figure 1:
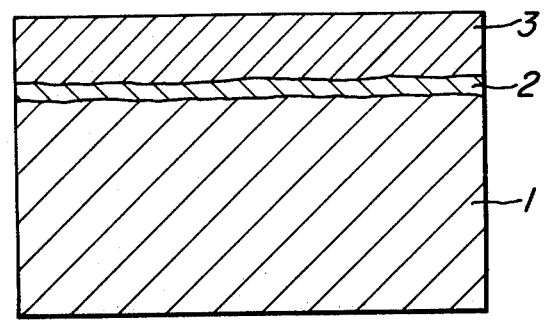
FIGS. 1 and 2 are enlarged views showing a bearing alloy structure in cross section according to this invention, respectively.

Description will now be given on a preferred embodiment of the invention in conjunction with the following tables as well as the accompanying drawing herewith.

Table 3 shows the conditions of fatigue test and heat seizure test to be met in the examples of the present invention. Table 4 shows the chemical compositions and mechanical properties of bearing alloy layers and the bearing structures, and Table 5 shows the results of the fatigue test conducted and Table 6 shows the results of the heat seizure test, respectively.

Table 3

| | TEST CONDITIONS | |
|---|---|---|
| | Fatigue Test | Heat Seizure Test |
| Test Machine | Radial Swing Type Bearing Test Machine | Radial Swing Type Bearing Test Machine |
| Test Load | 350 kg/cm² | Starting from 350 kg/cm² load, then adding 60 kg/cm² per 0.5 hour. |
| No. of Swing Motion | 300 cpm | |
| Angle of Swing Motion | ±20° | |
| Quantity of Oil | 0.3 l/min | |
| Method of Estimation of Fatigue | Check bearing metal at regular intervals for cracking | |
| No. of Swing Motion | | 300 cpm |
| Angle of Swing Motion | | ±20° |
| Quantity of Oil | | 0.05 l/min |
| Method of Estimation of Seizure | | Measurement of back surface temperature. Estimating that there occurred a seizure if that temp. reached 120° C. |

NOTE:
Standard metal bearing dimensions for use in a large-size marine engine are such that normal outer diameter is 450 to 830 mm, and bearing length is 120 to 400 mm, but in the above tests, due to the special limitation on the part of the test machine, small sized metal bearings having the shaft diameter of 100 mm and the bearing length of 40 mm were prepared specifically and subjected to the above test conditions.

Table 4

| Item | Specimen No. | Chemical Composition of Bearing Alloy (Wt. %) | | | | Tensile strength (kg/cm²) | Normal temp. hardness (Hv) | Bearing Structure | Type |
|---|---|---|---|---|---|---|---|---|---|
| | | Sn | Cu | Si | Al | | | | |
| Bearing as per Present Invention | 1 | 55 | 1.0 | — | Remain. | 10.2 | 26 | Steel Backing layer + Al. Bonded Layer + Bearing Alloy Layer | Al/Sn Bearing Alloy |
| Bearing as per Prior Invention | 2 | 55 | 0.3 | — | Remain. | 9.0 | 24 | | |
| | 3 | 55 | 0.4 | 1.5 | Remain. | 9.4 | 25 | | |
| Conventional Metal Bearing | A | 40 | 1.0 | — | Remain. | 11.0 | 33 | + Surface Layer (Sn: 10 Pb: Remain.) | 10 |
| | B | JIS. WJ 2 + Bonding Agent Cu 4.5, Sb 9.0, Sn remaining + Cr. 0.1, Be 0.02, Cd 0.7 | | | | 10.5 | 32 | Steel Backing layer + White Bearing Alloy Layer + Surface Layer (Sn: 10 Pb: Remain.) | Metal |

Table 5

RESULTS OF FATIGUE TESTS

| Item | Specimen No. | Test Period (Hr) | |
|---|---|---|---|
| | | 40 | 56 |
| Bearing as per Present Invention | 1 | o | o |
| Bearing as per Prior Invention | 2 | Δ | Δ |
| | 3 | o | Δ |
| Conventional Bearing | A | | o |
| | B | Δ | Δ |

NOTE:
1. Mark Δ represents a specimen wherein there occurred cracking on the bearing surface at the given test period of time.
2. Mark o represents a specimen wherein there occurred no cracking on the bearing surface at the given test period of time.
3. Test times on same test specimen: One test given on Specimen A, while two tests given on Specimens Nos. 1, 2, 3, and No. B, respectively.

Table 6

RESULTS OF HEAT SEIZURE TESTS

| Item | Specimen no. | Bearing Surface Pressure (Kg/cm²) | | | | |
|---|---|---|---|---|---|---|
| | | 470 | 530 | 590 | 650 | 710 |
| Bearing as per Present Invention | | | | | o | o |

Table 6-continued
RESULTS OF HEAT SEIZURE TESTS

| Item | Specimen no. | Bearing Surface Pressure (Kg/cm²) | | | | |
|---|---|---|---|---|---|---|
| | | 470 | 530 | 590 | 650 | 710 |
| Bering as per Prior Invention | 2 | | | | Δ | o |
| | 3 | | | | Δ | o |
| Conventional Bearing | A | Δ | Δ | | | |
| | B | | | | Δ | o |

NOTE:
1. Mark Δ represents a specimen observed seizure with the given bearing surface pressure (load).
2. Mark o represents a specimen left unseized with the given bearing surface pressure (load).
3. Two tests were given on same specimen, respectively.

EXAMPLE 1

Test samples were prepared as follows, i.e., a strip of each bearing alloy having the chemical composition according to those of Sepcimens 1, 2, 3 and A as shown in Table 4 were each over laid with a sheet or foil of aluminum, passed through a rolling machine to obtain an integrally compacted or bonded piece, and then further backed with a sheet of steel and rolled again through the rolling machine, thus obtaining integrally bonded strips having three layer structures therein. Thereafter, a thus obtained strip was press formed to a semi-circular cross section, (or additionally, electroplated with an alloy containing 10% of Sn and the remainder essentially of Pb on the above mentioned alloy surface), thereby obtaining a metal bearing sample of semi-circular cross section having a steel backing layer 1, a bonded layer of pure aluminum 2 and a layer of bearing alloy (see the enlarged cross-sectional views, FIGS. 1 and 2).

With respect to the Specimen B, a test sample was prepared in such manner that the surface of steel plate was lined with molten Sn base white metal having the composition shown in Table 2, then press-formed to a semi-circular cross section, (or furthermore, electroplated with an alloy containing 10% of Sn and the remainder essentially of Pb on the surface of the lining alloy surface), thus obtaining a semi-circular metal bearing sample.

Figure 3:
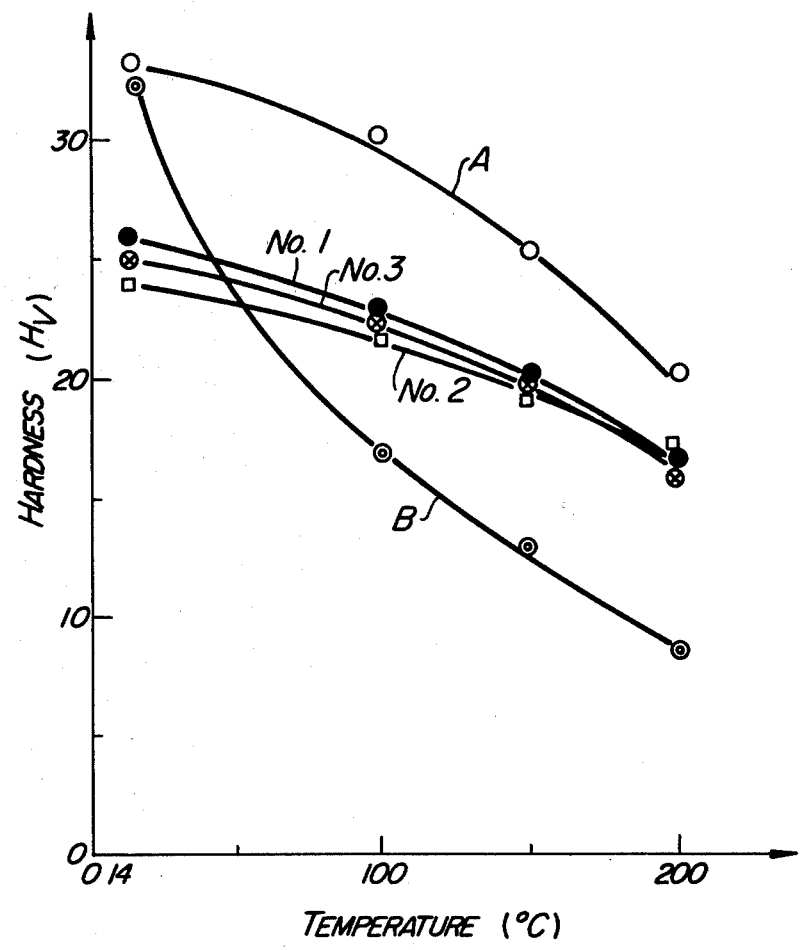
FIG. 3 is a graph showing the relationship between the hardnesses and measuring temperatures of a bearing alloy in the bearing alloy layer of an embodiment of the present invention, that of the embodiment of the applicant's prior invention, and that of the conventional bearing alloy.

As can been seen from Tables 5 and 6, Specimen No. 1 according to the present invention was found to be improved remarkably in fatigue resistance in comparison with that of the invention of the prior application (Specimens 2 and 3) as well as the conventional metal bearings (Specimens A and B). Also, as apparent from FIG. 3, it was proved that the bearing alloy according to this invention had a high temperature hardness at 100° C. or higher between that of the conventional bearing alloys (such as Specimens A and B).

Figure 2:
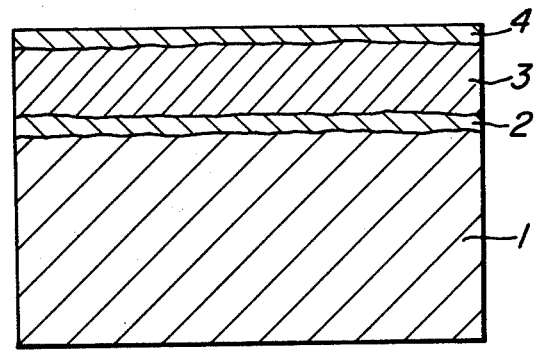

The surface layer of alloy 4 having an essential content of Pb as shown in FIG. 2 is provided for the purpose of obtaining an improvement in the anti-seizure property, embeddability and initial bedding-in property of the alloy, which layer is usually added with the elements of Sn, Cu, In, etc.

When this surface layer 4 is electroplated, there is also provided a thin layer of sincate and/or Ni plating between the bearing alloy layer 3 and the Pb-based surface layer 4. The above mentioned surface layer 4 may also be bonded by way of, for instance, sputtering other than the electroplating technique.

Although it was mentioned above that the surface layer is of a Pb-based alloy composition, this is not an essential requirement, but other type of metal or alloy composition may be applied appropriately.

It is preferable to conduct the bonding between the steel backing layer 1, the bonded layer of aluminum or aluminum alloy 2, and also the bonding between the bonded layer 2 and the bearing alloy layer 3 by way of pressure welding by using a rolling machine. However, this is not essential, and the same effect of bonding may be obtained through, for instance, the method of diffusion bonding, explosive forming, or the like.

When applying the above mentioned rolling pressure bonding process, if there is observed too much Sn oozing out during an annealing procedure, it is recommendable to provide a layer of pure aluminum on the surface of the bearing alloy layer in the preparation of a bearing strip. This pure aluminum layer may be removed during a machining process.

What is claimed is:

1. A multi-layer metal bearing for use in a large-size engine having three layers consisting of a steel backing layer, a bonding layer of aluminum or aluminum alloy, and a bearing alloy layer, the improvement wherein said bearing alloy layer has the compositions of more than 50% up to 65% by weight tin, more than 0.5% up to 1.5% by weight copper, and the remainder essentially of aluminum, and said bearing alloy exhibits high temperature hardnesses at 100° C. or higher that varies continuously within the following range, i.e.;

At 100° C.—18 to 29 Hv
At 150° C.—14 to 24 Hv
At 200° C.—9 to 19 Hv.

2. The metal bearing as claimed in claim 1 wherein said bearing alloy layer contains further compositions of 2% by weight or less in total of at least one element selected from the group consisting of Ni, Si, Sb, Mn, Pb, and Zn.

3. A multi-layer metal bearing for use in a large-size engine having three layers consisting of a steel backing layer, a bonding layer of aluminum or aluminum alloy, a bearing alloy layer, and a surface layer, the improvement wherein said bearing alloy layer has the compositions of more than 50% up to 65% tin, more than 0.5% up to 1.5% by weight of copper, and the remainder essentially of aluminum, and said bearing alloy exhibits high temperature hardnesses at 100° C. or higher that vary continuously within the following range, i.e.;

At 100° C.—18 to 29 Hv
At 150° C.—14 to 24 Hv
At 200° C.—9 to 19 Hv.

4. The metal bearing as claimed in claim 3 wherein said bearing alloy layer contains further compositions of 2% by weight or less in total of at least one element selected from the group consisting of Ni, Si, Sb, Mn, Pb, and Zn.

* * * * *